United States Patent [19]

Pollman et al.

[11] Patent Number: 4,537,364

[45] Date of Patent: Aug. 27, 1985

[54] CONSTANT TENSION CABLE REEL DRIVE

[75] Inventors: Frederic W. Pollman, Ames; David W. Reynolds, Huxley, both of Iowa; Richard Heiser, Wayzata, Minn.

[73] Assignee: Sundstrand Corporation, Rockford, Ill.

[21] Appl. No.: 449,920

[22] Filed: Dec. 15, 1982

[51] Int. Cl.³ .............................................. B65H 75/42
[52] U.S. Cl. ..................... 242/86.51; 242/75.51; 254/361; 60/448; 60/452
[58] Field of Search ................ 242/75.53, 86.5, 86.51, 242/75.51, 86.52; 254/274, 361, 275; 60/911, 445, 446, 448, 451, 452

[56] References Cited

U.S. PATENT DOCUMENTS

| | | | |
|---|---|---|---|
| 2,079,268 | 5/1937 | Wiedmann | 242/75.53 |
| 2,764,365 | 9/1956 | Davis et al. | 242/75.53 |
| 3,240,443 | 3/1966 | Nitka | 242/75.53 |
| 3,250,492 | 5/1966 | Hlinsky et al. | 242/86.51 |
| 3,334,839 | 8/1967 | Carlson | 242/86.51 |
| 3,411,055 | 11/1968 | Carter, II et al. | 242/75.51 |
| 3,667,225 | 6/1972 | Karman | 60/911 X |
| 3,679,180 | 7/1972 | Callaghan | 254/361 X |
| 3,713,009 | 1/1973 | Poppinger et al. | 242/75.51 X |
| 3,744,243 | 7/1973 | Faisandier | 60/452 X |
| 3,749,988 | 7/1973 | Pittner | 242/75.44 X |
| 3,749,989 | 7/1973 | Pittner | 242/75.44 X |
| 3,788,575 | 1/1974 | Boettcher et al. | 242/86.5 R |
| 3,817,033 | 6/1974 | Appel et al. | 254/361 X |
| 3,910,521 | 10/1975 | O'Callaghan et al. | 242/75.51 |
| 3,916,279 | 10/1975 | Kawano et al. | 254/275 X |
| 3,963,217 | 6/1976 | Dwight | 242/75.53 X |
| 4,108,264 | 8/1978 | Tanaka | 242/86.51 X |
| 4,114,827 | 9/1978 | Maier | 242/86.51 |
| 4,276,498 | 6/1981 | Stager et al. | 242/75.51 X |
| 4,349,179 | 9/1982 | Barber | 254/275 X |
| 4,362,182 | 12/1982 | Sjolund | 137/85 |
| 4,399,886 | 8/1983 | Pollman | 60/445 X |

FOREIGN PATENT DOCUMENTS

1096577 10/1957 Fed. Rep. of Germany .

Primary Examiner—Stephen Marcus
Assistant Examiner—Leo J. Peters
Attorney, Agent, or Firm—James A. Wanner; Ted E. Killingsworth; Harold A. Williamson

[57] ABSTRACT

The present invention provides an improved control system for a driven cable reel mounted on a vehicle wherein the reel is adapted to pay-in and pay-out electrical cable to supply power to the vehicle, such as a mine car. The control system modifies the torque supplied by the reel drive so as to maintain a relatively constant tension on the cable. The improved control system has a first or basic output which provides higher torque when the reel is paying in cable and provides lower torque when the reel is paying out cable, the difference in drive torque being necessary to compensate for the reversal of frictional characteristics during paying in and paying out of the cable. The control system further provides a transient condition output signal to modulate the drive of the cable reel in a manner which compensates for acceleration and deceleration of the cable reel to reduce cable slack and prevent a sudden increase in cable tension which could cause cable breakage.

12 Claims, 9 Drawing Figures

CONSTANT TENSION CABLE REEL DRIVE

FIELD OF THE INVENTION

This invention relates to a control system for a driven cable reel mounted on a vehicle wherein the reel is adapted to pay-in and pay-out electrical cable to supply power to the vehicle, such as a mine car.

BACKGROUND OF THE INVENTION

It is well known in the prior art of electrically driven vehicles, such as mine cars, to have an external power supply connected to the vehicle by means of a cable which is wound on a reel mounted on the vehicle. The connection to the main power supply is referred to as the tie-point. The tie-point is normally located somewhere near the midpoint of expected vehicle travel so as to reduce by half the needed length of cable as compared to when the tie-point is located at one end of the expected path of travel. As the vehicle approaches the tie-point the cable reel need be driven in a direction which takes up the cable slack and winds the cable on a reel, this being referred to as the pay-in condition. When the vehicle is moving away from the tie-point, the tension on the cable unwraps the cable from the reel proportional to the distance of vehicle travel, this being referred to as the pay-out condition. During pay-out, if the reel is allowed to free-wheel, inconsistent velocities of the vehicle induce momentary excessive turning of the reel due to reel inertia, causing cable slack, or instantaneous extra tension on the cable, both of which are undesirable. Furthermore as the vehicle passes under the tie-point, excessive deceleration and acceleration forces are applied to the cable and cable reel which tends to cause cable breakage.

One prior art system is taught in Maier U.S. Pat. No. 4,114,827 issued Sept. 19, 1978 wherein the cable reel drive consists of an electric reel motor driving a fixed displacement pump which in turn drives a fixed displacement motor connected to the cable reel. Interposed between the pump and the motor is a valve which automatically by-passes pump flow when the cable reel is paying out. Another prior art construction is Boettchler et al U.S. Pat. No. 3,788,575 issued Jan. 29, 1974 wherein the control of the hydraulic motor driving the cable reel is obtained by sensing cable tension directly to operate a flow control valve. This system controls motor speed and is not a pressure controlled system. U.S. Pat. Nos. 3,749,988 and 3,749,989 issued July 31, 1973 to John Pittner detect coil diameter and the coil rpm to modulate a D.C. electric motor field in a reel drive. None of these systems modulate the torque of the cable reel drive relative to a friction reversal between a paying in or a paying out condition, or generate a transient condition signal proportional to reel acceleration to further modify reel drive.

U.S. Pat. No. 4,108,264, issued Aug. 22, 1978, to Tanaka teaches a cable reel mechanism wherein slack angle is measured to modify the electric drive on the cable wheel and provide braking against rewind. While the patent recognizes the adverse disadvantages of vehicle velocity changes, such changes are compensated for by means of gear shift lever switches. There is also no recognition of cable reel acceleration changes as the vehicle passes a tie-point.

SUMMARY OF THE PRESENT INVENTION

The present invention provides a vehicle mounted cable reel which modulates the torque applied by the reel drive so as to maintain a relatively constant cable tension. The tension on the vehicle cable, without compensation, varies significantly between pay-in and pay-out conditions due to reel inertia and friction generated in the system. Furthermore, the tension on the cable varies significantly due to acceleratons and decelerations of the cable reel caused by changes in velocity of the vehicle and the passing of the vehicle past the cable tie-point. The control system of the present invention compensates for such condtions so as to maintain a substantially constant cable tension.

It is thus an object of the present invention to provide a control system which modulates the drive of a cable reel under both pay-in and pay-out conditions.

It is a further object of the present invention to have a control system with a basic signal which modulates cable reel drive during pay-in and pay-out conditions, and further provides a transient condition signal in addition to the basic control signal to compensate for acceleration and deceleration of the cable reel.

It is still a further object of the present invention to provide a novel hydraulic drive for the cable reel which utilizes an electrohydraulic control responsive to cable reel rpm to modulate the cable reel drive in response to cable reel acceleration and deceleration, independent of separate measurement of vehicle displacement or movement.

It is still a further object of the present invention to detect the sense of direction of rotation of a cable reel to determine whether the cable is in a pay-out or pay-in condition to apply a greater torque in the drive of the cable reel during a pay-in condition to make up for frictional losses in the system.

It is a further object of the present invention to utilize a cable reel diameter sensor to determine the combination diameter of the cable reel and the cable wrapped thereon to modify the cable reel drive in response to the amount of cable on the cable reel.

A still further object of the present invention is to provide a control system for use with a vehicle mounted cable reel having a drive mechanism, the control system controlling the drive torque output of the mechanism to a cable reel, the control system comprising; basic command means providing a basic command signal for controlling the drive mechanism, speed sensing means responsive to the rotation of the cable reel to provide a speed signal proportional to cable reel rpm, transient condition command means responsive to the output of the speed sensing means to provide a transient condition signal for addition to the basic command signal, and summing means for receiving both the basic command signal and the transient condition signal and having an output signal provided to the drive mechanism whereby the basic command signal is modified by the transient condition signal.

A further object of the present invention is to provide a control system for use with a vehicle mounted cable reel having a drive mechanism, the control system controlling the drive torque output of the mechanism to a cable reel capable of rotation in a pay-in direction and in an opposite pay-out direction, the control system comprising; command means providing a command signal for controlling the drive mechanism, the command means including direction detector means responsive to the rotation of the cable reel to provide a pay-in and a pay-out signal wherein the pay-in signal is greater than the pay-out signal to make up reversal of cable reel friction between the pay-in direction of rotation and the pay-out direction of rotation, the pay-in and the pay-out signals being supplied to the drive mechanism for controlling the operation thereof.

DESCRIPTION OF THE PREFERRED EMBODIMENT

Figure 1:
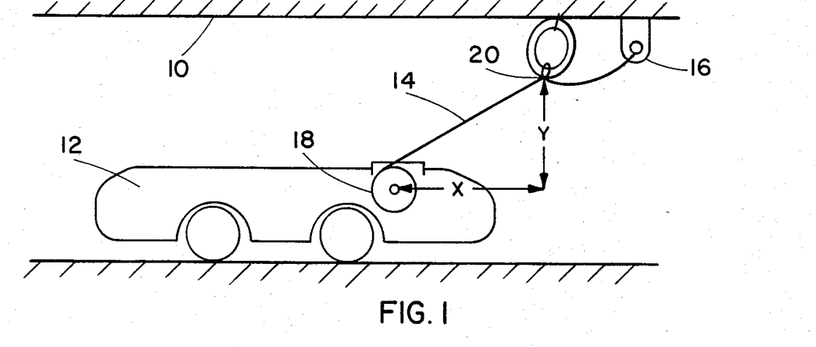
FIG. 1 is a cross-sectional view of a horizontal mine shaft with a mine car incorporating the cable reel drive of the present invention.

FIG. 1 depicts a horizontal mine shaft 10 with a mine shuttle car 12 which is used to carry mine personnel and loads such as coal during operation of the mine. On such mine shuttle cars it is undesirable to use combustion engines due to the noxious fumes and other hazards. Therefore mine shuttle cars are quite often electrically propelled. For such vehicles, batteries have proven to have insufficient power storage. Therefore it is common practice to utilize an electric cable 14 connecting the shuttle car 12 to a stationary source of electric power such as 16. Since the distance of travel of the shuttle car is quite significant, for instance 1,000 feet, the cable 14 is wound on a cable reel 18 mounted on the shuttle car 12. As the shuttle car 12 passes to and from the stationary power source, the cable 14 must pay in and pay out from the cable reel. To prevent the cable 14 from being pulled from the stationary electric source 16, it is common to resiliently attach the cable 14 to the mine wall near the electric source point 16. As represented in FIG. 1, the resilient attachment is often provided by the economical expedient of tying the cable 14 to a used automobile tire fastened to the mine wall and referred to herein as the tie-point 20. To keep slack from forming in the cable 14 or to prevent too much tension from occurring on the cable 14 which causes breakage, a fixed tension is maintained on the cable by controlling the drive to the cable reel 18.

As the vehicle or shuttle car 12 moves from the tie-point 20 over a displacement X, the tension in the cable 14 tends to unwind or pay out the cable 14 from the cable reel 18. To maintain substantially constant tension on the cable 14, for instance 100 pounds, sufficient torque must be applied to the cable reel 18 to maintain this tension by resisting cable reel rotation in the pay-out direction. When the shuttle car 12 approaches the tie-point 20, sufficient reeling in drive must be applied to the cable reel 18 to also maintain the 100 pound tension on the cable 14.

It is noted from FIG. 1 that the tie-point 20 is typically vertically located relative to the cable reel by the distance Y. As the shuttle car 12 passes through the vicinity and under the tie-point 20, large instantaneous decelerations and accelerations are applied to the cable reel 18 due to the resultant forces. Furthermore, any stopping and starting of the shuttle car 12 in its travel through the mine shaft also induces deceleration and accelerations on the cable reel 18. These accelerations and decelerations tend to affect the tension on the cable 14, which in extreme cases such as passing under the tie-point, tend to cause cable breakage. The transient control of the present invention modulates the drive on the cable reel 18 so as to maintain the tension on the cable 14 at a relatively constant value even under these extreme conditions.

Figure 2:
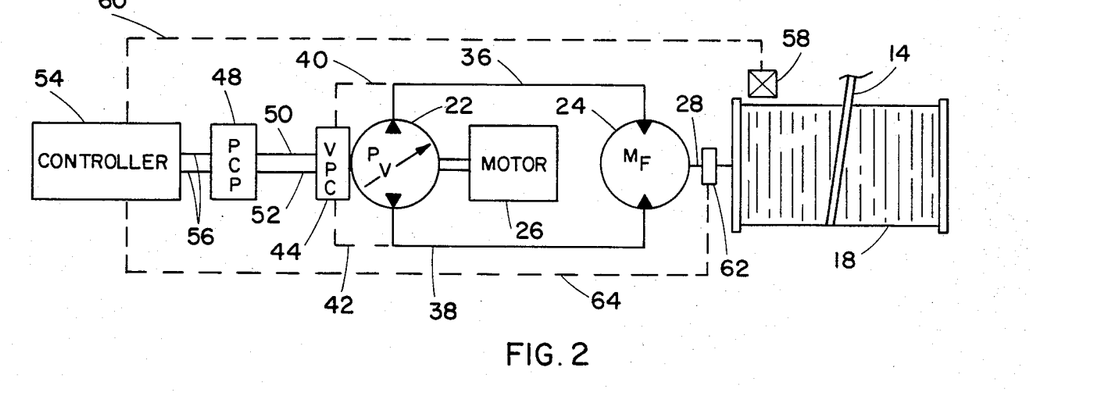
FIG. 2 is a diagramatic illustration of the cable reel drive control system of the present invention.

In the preferred form of practicing the invention, cable reel 18 is driven by a hydrostatic transmission consisting of a variable displacement pump 22 and a fixed displacement motor 24 as shown in FIG. 2. The pump 22 is driven by a constant speed electric motor 26 and the fixed displacement motor 24 drives cable reel shaft 28. Due to the variable displacement nature of the pump 22 of the hydrostatic transmission, the constant speed drive of the electric motor 26 can be modified to provide a substantially constant torque drive to the cable reel 18. For this purpose, the two sides of the main loop of the transmission, that is fluid conduits 36 and 38 joining the pump 22 with the motor 24, are connected by feedback lines 40 and 42 to a variable pressure controller or VPC 44 for the pump 22. The two feedback lines 40 and 42 sense the pressure differential across the transmission main loop to apply a pressure input to the VPC 44 as will be explained later. The pressure differential across the main loop represents transmission output torque as motor output torque is proportional to pressure differential.

A second input to the variable pressure controller 44 is provided by an electrohydraulic transducer such as a proportional controlled pilot valve or PCP 48 which is connected to the VPC 44 by hydraulic lines 50 and 52. The PCP 48 consists of an electric force motor operating a pilot valve as will be explained below in connection with FIG. 3. The input for the PCP 48 is an electric signal generated by controller 54 which is connected to the PCP 48 by lines 56. The controller 54 has two input signals generated by a cable reel diameter sensor 58 connected to the controller by line 60 and a D.C. tachometer 62 measuring the rotation of shaft 28 and connected to the controller by line 64. One form of cable reel diameter sensor 58 can be a potentiometer operated by a feeler riding on the external surface of the cable 14 wound on reel 18. Thus the diameter sensor 58 actually measures the reel diameter plus the amount of cable 14 wound thereon. The D.C. tachometer 62 is of standard form and provides a voltage signal proportional to the rpm or rotational direction and velocity of the reel 18.

Figure 3:
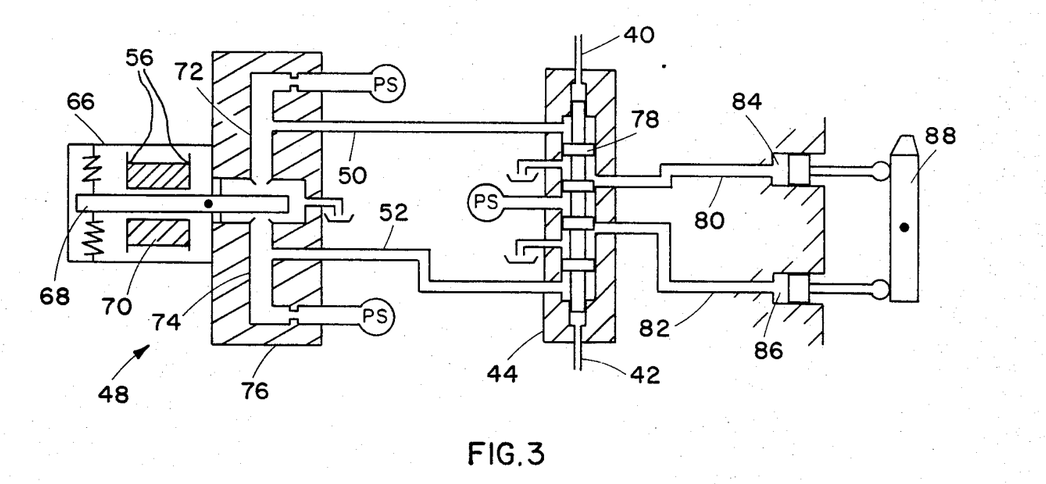
FIG. 3 is a diagramatic illustration showing the hydraulic elements of the control system of FIG. 2.

FIG. 3 shows the electro-hydraulic control of the variable displacement pump 22 of FIG. 2. Tne electric controller 54 is connected to an electric force motor 66 of the PCP 48 by means of electric lines 56. The electric force motor 66 has a spring centered flapper 68 and a coil 70 surrounding the flapper 68. Current flow through the coil 70 induces pivotal movement to the flapper 68, the opposite end of which is positioned between nozzles 72 and 74 of a pilot valve 76 of the proportional control pilot valve 48. The two nozzles 72 and 74 are provided with fluid under pressure from a pressure source PS and the positioning of the right end of the flapper 68 relative to the two nozzles generates a fluid back pressure differential between lines 50 and 52 connecting the pilot valve 76 with the VPC 44. Greater detail of the PCP is disclosed in U.S. Pat. No. 4,362,182 issued on Dec. 7, 1982 to Sjolund.

The VPC 44 consists of a valve body having a spring centered valve spool 78 which modulates fluid flow from the pressure source PS to outlet lines 80 and 82 connected to servo cylinders 84 and 86 which modulate the position of a swash plate 88 for the variable displacement pump 22. The flow from the pressure supply PS to the swash plate servo cylinders 84 and 86 is modulated by the axial positioning of the valve spool 78. The value spool 78 is moved from its centered position by fluid pressure differential across the main loop of the transmission as supplied by feedback lines 40 and 42, such pressure differential representing output torque of the transmission as explained above. The valve spool 78 may also be moved by a fluid pressure differential in lines 50 and 52 caused by displacement of the flapper 68 of the PCP 48 and which represents a hydraulic input signal to the VPC 44. Due to the main loop pressure differential feedback which reaches equilibrium with the VPC input signal, the control system provides for controlled output torque proportional to PCP current input, rather than controlled speed of the cable reel drive.

While the preferred form of practicing the invention utilizes a variable displacement hydrostatic transmission, other forms of driving the cable reel 18 are contemplated. One such form is a fixed displacement pump driving the motor 24 with an electrohydraulc transducer (such as PCP 48) modulating a control valve between the pump and motor. To provide the variable torque control, the control valve should be responsive to the pressure differential across the motor to provide torque feedback.

Figure 4:
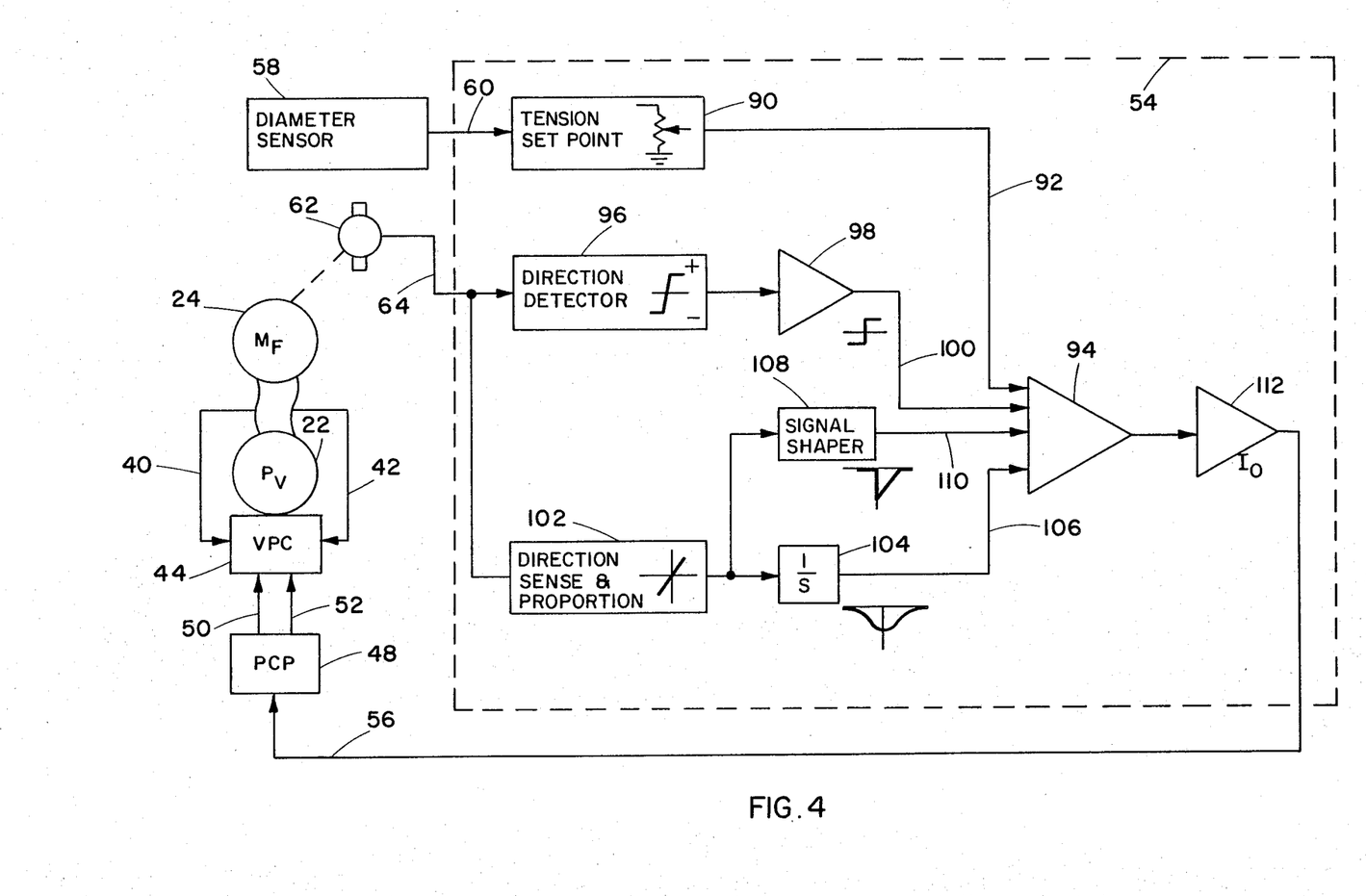
FIG. 4 is a schematic diagram of the electrical control circuit utilized in the control of FIG. 2.

FIG. 4 is a schematic diagram for the controller 54 which provides the input current signal to the PCP 48. As explained above, the controller 54 has a first input provided by diameter sensor 58 and line 60 and a second input provided by the D.C. tachometer 62 and line 64. The diameter input signal is modified by tension setpoint adjustment 90 consisting of a variable resistor and then passes through line 92 to a summing amplifier 94. The D.C. tachometer input is proportional to reel 18 rpm and also provides an indication of direction of reel 18 rotation. The tachometer 62 input is provided to a direction detector 96 which provides a signal of a positive one-half volt representing reel rotation in a first direction for paying in of the cable 14 and a signal of a negative one-half volt representing reel rotation in the opposite direction for paying out of the cable 14. Amplifier 98 magnifies the signal from direction detector 96. This magnified signal is then also provided to the summing amplifier 94 by line 100 and which in combination with the diameter signal forms a basic command signal $I_B$ (FIG. 5) for the control system.

Figure 8:
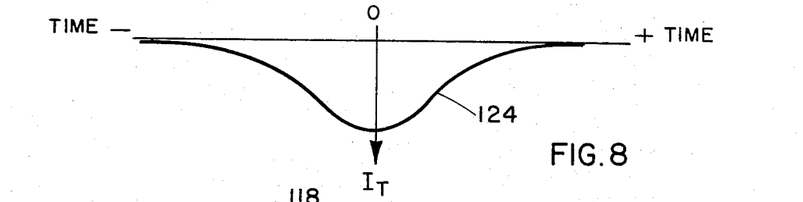
FIG. 8 is a graph representing transient condition signal generated by cable reel deceleration and acceleration in the immediate vicinity of the cable tie-point.

The output of tachometer 62 is also provided to a direction sense and proportion amplifier 102 whose output represents reel 18 rpm with a positive excursion for paying in of the cable 14 and a negative excursion for paying out of the cable. The output of amplifier 102 is provided to differential amplifier 104 whose output represents the acceleration and deceleration of the cable reel 18. The output of differential amplifier 104 is provided to the summing amplifier 94 via line 106. The output of the direction sense and proportion amplifier 102 is also provided to a shaping amplifier 108 which provides a negative current output upon a severe deceleration change of the reel 18. This output is also received by the summing amplifier 94 via line 110 and combines with the signal of line 106 to form a transient condition signal $I_T$ (FIG. 8).

The output of the summing amplifier 94 is magnified by the power amplifier 112 to provide total control signal $I_O$ through line 56 to the PCP 48 which modulates the operation of the VPC 44 along with the feedback signal through lines 40 and 42 to control the operation of the variable displacement transmission.

Operation

Figure 5:
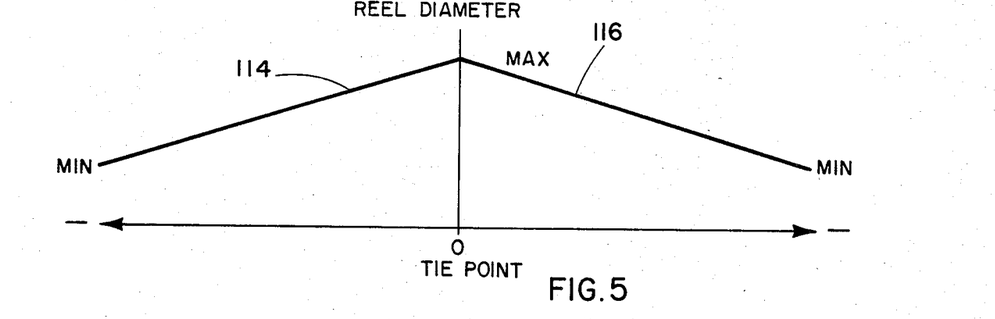
FIG. 5 is a graph showing reel diameter compared to vehicle displacement from the tie-point.

The operation of the control system can best be understood by reviewing the graphs of FIGS. 5-9. FIG. 5 represents the sensed reel diameter, that is the cable reel 18 diameter plus the amount of cable wound thereon as determined by diameter sensor 58. When the vehicle 12 is near the tie-point 20, the maximum amount of cable 14 is wound on the reel 18. When the vehicle 12 is furthest from the tie-point 20 in either direction, the cable 14 is unwound from the reel 18 providing a minimum sensed diameter. This is represented by lines 114 and 116 of the graph of FIG. 5.

Figure 6:
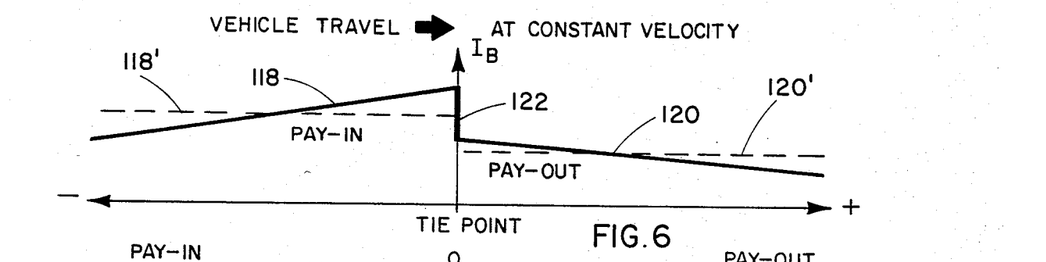
FIG. 6 is a graph showing current output of the basic control signal relative to vehicle displacement from the tie-point.

FIG. 6 represents a basic control current $I_B$ relative to vehicle 12 displacement from the tie-point 20 with the current $I_B$ being relatively proportional to the sensed reel diameter. Since there is a different basic control signal $I_B$ for a pay-in condition relative to a pay-out condition, it is important to notice in FIG. 6 that the vehicle 12 travel is from left to right. If the vehicle 12 travel is reversed, the current output $I_B$ of FIG. 6 will be reversed about opposite sides of the ordinate of the graph.

As the vehicle 12 travels toward the tie-point 20, that is in a pay-in condition, the current output $I_B$ will increase proportional to the amount of cable 14 wrapped on the reel 18 as represented by line 118. During the pay-in operation, considerable friction will be encountered by the cable reel 18. Therefore in addition to the signal generated by the diameter sensor 58, an additional signal is added at the summing amplifier 94 by the direction detector 96 and amplifier 98. For example, in a cable reel system having an empty reel 18 diameter of 10" and a full reel 18 diameter of 25" with approximately 500' of cable wound thereon, the basic signal $I_B$ would follow the equation $I_B$ (milliamps)$=0.75\times$(sensed reel diameter in inches)$+13.0$ and provide a first level of command. The extra 13 milliamps are necessary to make up for additional forces encountered by cable reel inertia and friction as the cable 14 is wound thereon. The first factor of the equation increases the torque of the hydrostatic transmission to make up for the increased moment arm of the applied cable tension as the reel diameter increases. This results in approximately 100 lb. tension on the cable 14 during the pay-in condition with the vehicle 12 traveling toward the tie-point 20 and the cable reel 18 being driven by the transmission.

After the vehicle 12 passes the tie-point 20 and proceeds away from the tie-point 20, cable tension will pull the cable 14 from the reel 18 and thus unwind the cable 14 from the cable reel 18. However, sufficient hydraulic drive must be applied to the reel 18 in a pay-in direction, that is in a positive current direction, to resist rotation of the reel 18 in the pay-out direction in an amount sufficient to maintain the 100 lb. tension on cable 14. Under the pay-out conditions, the cable reel 18 and thus motor 24 are driven by cable tension opposite the resisting torque of the hydraulic system. The friction losses of the cable reel 18 are reversed in the pay-out condition and thus the basic current signal $I_B$ follows the equation $I_B$ (milliamps)=0.75×(reel diameter in inches)+4.4 and provide a second lower level of command. Since the 4.4 milliamp constant during the pay-out condition is lower than the 13.0 milliamp constant of the pay-in condition, there is instantaneous reduction in the basic current signal $I_B$ as the vehicle passes tie-point 20. This is represented by line 122 of the graph of FIG. 6 which represents the current drop necessary to make up for the reverse in reel frictional losses between the pay-in and pay-out conditions.

As an alternative in order to provide a more simplified and less expensive control system, the cable reel diameter sensor 58 may be eliminated and the tension set point rheostat 90 is adjusted to apply a constant output equal to the output for an average cable reel diameter. The amplifier 98 still provides a first and second level of command signal for pay-in and pay-out and thus $I_B$ for a pay-in condition would be $I_B$ (milliamps)=0.75 (average cable reel diameter in inches)+0.13 and for a pay-out condition $I_B$ (milliamps)=0.75 (average cable reel diameter in inches)+4.4. Thus the lines 118 and 120 of FIG. 6 would be horizontal as represented by dotted lines 118' and 120' in FIG. 6. Again it is noted that compensation is provided for reversal in the frictional characteristics between the pay-in condition and the pay-out condition.

Figure 7:
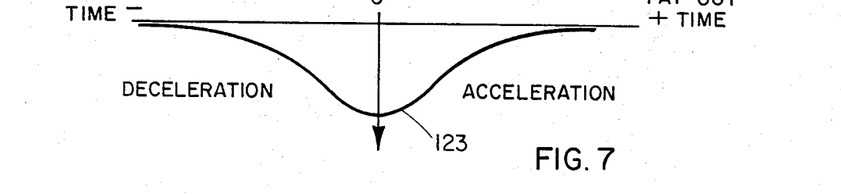
FIG. 7 is a graph showing cable reel deceleration and acceleration in the immediate vicinity to the cable tie-point.
Figure 9:
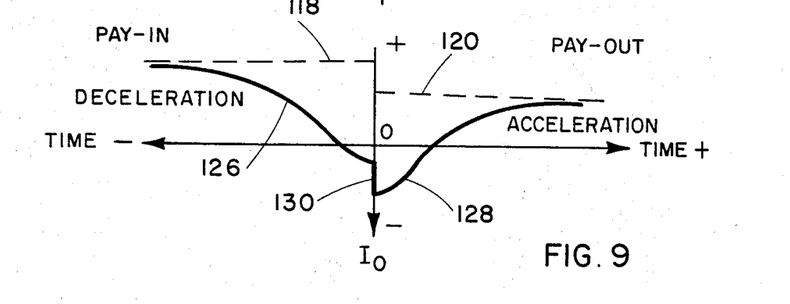
FIG. 9 is a graph representing total control output signal incorporating both the basic control signal of FIG. 6 and the transient condition control signal of FIG. 8 when the vehicle is in the immediate vicinity of the tie-point.

As the vehicle 12 passes under the tie-point 20, another additional factor is introduced on cable tension, this factor being the deceleration and acceleration applied to the cable reel 18. FIGS. 7 and 8 represent cable reel acceleration and deceleration and the transient signal $I_T$ generated thereby when the vehicle 12 passes under the tie-point 20. The cable reel 18 deceleration and acceleration will be proportional to vehicle velocity changes and also the changes in the distance between the cable reel 18 and the tie-point 20 represented by the length of cable 14 due to geometry effects (FIG. 1). For the graphs of FIGS. 7, 8 and 9 it is assumed that the vehicle is traveling from left to right at a constant velocity of 5.2 mph and the vertical distance Y is approximately 7 feet. As the distance X approaches the magnitude of distance Y, cable length 14 changes less rapidly. When reel 18 is directly under the tie-point 20, cable length 14 does not change. As vehicle 12 moves away from the tie-point 20, cable length 14 gets larger at an increasing rate. Since this phenomenon only occurs in the vicinity of the tie-point 20, the abscissa of the graphs of FIGS. 7, 8 and 9 represents approximately 4 seconds total time or a vehicle travel in the neighborhood of 30 feet. Thus the abscissa of these graphs is not proportional to the graphs of FIGS. 5 and 6 wherein the vehicle travel distance represents approximately 1,000 feet.

As the vehicle or mine car 12 passes through the tie-point 20, the cable reel 18 due to the change in tension on the cable 14 senses a quick deceleration and then acceleration as shown by line 123 in the graph of FIG. 7. This occurs over an approximately 4 second interval or when the vehicle 12 is within plus or minus 15 feet of the tie-point 20 when traveling at 5.2 mph. A higher vehicle velocity would increase the deceleration/acceleration characteristic on the cable reel 18 as sensed by the D.C. tachometer 62 and converted to an acceleration signal by differentiating amplifier 104. The deceleration/acceleration characteristic is obtained since the system is trying to maintain a constant 100 lb. tension on the cable 14 and the cable reel 18 is rotating in a pay-in direction as the vehicle 12 approaches the tie-point 20 and rotating in a pay-out direction after the vehicle 12 passes the tie-point 20. Since the cable reel 18 rotational velocity reverses direction, the cable reel 18 at one instance of time has zero velocity which requires that the cable reel 18 to decelerate and then accelerate in the opposite direction of rotation in order to obtain the rotational velocity reversal.

It is also noted that the amount of deceleration and acceleration of the cable reel 18 is influenced by the passing distance of the cable reel 18 from the tie-point 20, that is the distance Y shown in FIG. 1. Just as there is negligible acceleration effects on the cable reel when the vehicle 12 is a long distance from the tie-point 20, an increased dimension Y will reduce the acceleration effects although there still must be a reversal of direction of reel 18 rotation. A very short distance Y causes the acceleration effects at the tie-point 20 to be compressed within a shorter distance of vehicle 12 travel and thus the acceleration effects are magnified increasing the curve 123 of FIG. 7. The magnitude of deceleration/acceleration effects are also affected by the resiliency of the tie-point 20.

FIG. 8 represents a transient output signal or $I_T$ generated by the controller 54 in response to the deceleration/acceleration effects of FIG. 7. The transient signal $I_T$ is generated by the D.C. tachometer 62 which provides a signal to amplifier 102 which has an output in proportion to the rotational velocity of the cable reel 18 and also the directional sense of rotation of the cable reel 18. The output of amplifier 102 is differentiated by the differential amplifier 104 whose output to the summing amplifier 94 is proportional to the deceleration and acceleration of the cable reel 18. This is represented by line 124 of the graph of FIG. 8.

Because of time lags in the control, it is desirable to have a resilient member at the tie-point 20 in order to allow cable tension to remain constant during direction reversal of reel 18. However, this spring increases the acceleration rate of reel 18 (relative to its deceleration rate immediately prior to reel direction reversal) due to the vehicle velocity component. To account for this, amplifier 108 is an optional shaping amplifier which can generate an additional negative current output during delayed acceleration at the point of reversal of cable reel 18 rotation. It receives an input from amplifier 102. The output of amplifier 108 may be used if necessary to generate a further negative current input to the hydrostatic transmission control to aid in reversing the cable reel drive during passing of the vehicle 12 past the tie-point 20.

When the vehicle 12 is traveling at constant velocity and at some distance from the tie-point 20, the controller 54 output current is substantially $I_B$ as represented in FIG. 6 and always positive, thus applying a pay-in torque on the cable reel 18 in a manner which provides relatively constant tension on the cable 14. While it is recognized that cable reel velocity must be slowly reduced as the vehicle 12 moves toward the tie-point 20 at constant velocity (since the effective reel diameter is increasing requiring fewer revolutions to recover a given amount of cable 14), such deceleration effect is minimal. The slight acceleration, for the opposite reason, when the vehicle 12 moves away from the tie-point is also minimal. Thus when the vehicle 12 is at a substantial distance from the tie-point and traveling at a constant velocity, there is negligible acceleration and deceleration effects on the cable reel 18.

However, when the vehicle 12 is near the tie-point 20, the acceleration generated transient signal $I_T$ (which is always negative) is subtracted from the basic signal $I_B$ providing a total output signal $I_O$ as shown in FIG. 9. When the vehicle 20 is traveling toward the tie-point 20, and thus the cable reel 18 is in a pay-in condition, the total output signal $I_O$ is represented by line 126. As the vehicle 12 passes the tie-point 20, and thus the cable reel 18 is in a pay-out condition, the total output signal $I_O$ is represented by line 128. It is noted that adjacent the tie-point 20, there is a substantial negative jump 130 in the total output signal $I_O$ which is due to the negative jump 122 shown in FIG. 6 and from optional signal shaper 108. The total output signal $I_O$ immediately adjacent to tie-point 20 has a negative excursion and thus applies a negative torque drive to the cable reel 18 in a direction which tends to pay out the cable 14. If the optional signal shaper 108 of controller 54 is used to help for the transient condition signal $I_T$, the negative excursion 130 of the output signal $I_O$ is increased. This aids in bringing the cable reel 18 to a zero rotational velocity condition and then reversing the cable reel 18 to permit pay-out. As noted by line 128 of the graph of FIG. 9, the signal $I_O$ soon becomes positive to again apply a torque on the cable reel 18 in a take-up direction in order to resist cable 14 pay-out to maintain relatively constant tension as reel acceleration reduces. The output torque of the system is proportional to $I_O$.

The transient condition signal $I_T$ is generated solely by measuring the rotational velocity of the cable reel 18. There is no direct measurement of vehicle 12 velocity or vehicle 12 displacement from the tie-point 20. There is also no requirement to directly measure the tension on cable 14. Therefore the transient condition signal $I_T$ also compensates for cable reel acceleration changes that occur remote from the tie-point. If the mine car 12, due to a work operation, is brought to a stop and then restarted at a point remote from the tie-point 20, this also generates a deceleration and acceleration signal (at a lesser extent than the acceleration changes at the tie-point) since there will be a change in rotational velocity of the cable reel 18. This is measured by the D.C. tachometer 62 and this transient condition input is also applied to the basic signal $I_B$ to control the hydraulic drive to the cable reel 18 to aid in maintaining cable 14 tension constant. The transient condition signal $I_T$, both during passing of the tie-point and during vehicle stoppage and starting, thus generates a negative current to reduce the basic signal $I_B$ in a manner which reduces hydraulic torque on the cable reel 18 to prevent instantaneous increases in tension on the cable 14 and thus reduce the possibility of cable breakage.

It is thus seen that the primary objects of the invention are fully met by the above described structure to provide a torque control for a cable reel drive. The torque control has a first or basic signal which modifies the drive between a pay-in and a pay-out condition and thus compensates for the reversal of frictional characteristics between the two conditions on the cable reel. The torque control further has a transient condition signal which modulates the drive of the cable reel to compensate for acceleration changes of the cable reel and provide for hydraulic drive to aid in the reversal of cable reel rotation when the vehicle passes the tie-point and thus reduce cable breakage. There is also a transient signal which compensates for spring at the tie-point. It is further understood that various modifications could be made to the preferred embodiment described in detail above, and that such modifications would fall within the spirit of the invention as claimed below.

We claim:

1. A control system for use with a vehicle mounted cable reel, a hydraulic motor for driving said cable reel, a source of hydraulic fluid under pressure for driving said motor, and said control system modulating the fluid flow from said source to said motor comprising; flow control means responsive to the fluid pressure differential across said motor which represents a torque feedback signal, electrohydraulic transducer means providing an input command signal to said flow control means, basic command means providing a basic signal for controlling said transducer means, speed sensing means responsive to the rotation of said cable reel to provide a speed signal proportional to cable reel rpm, transient condition command means receiving said speed signal and differentiating said speed signal to provide an acceleration signal, said acceleration signal being further provided to said transducer means to modify said basic signal in response to cable reel deceleration and acceleration to form said command signal, said flow control means responding to said command signal to drive said motor in a manner which reaches equilibrium between said torque feedback signal and said command signal.

2. The control system of claim 1 wherein said cable reel has a pay-in direction of rotation and a pay-out direction of rotation, said basic command means including direction detector means responsive to the rotation of said cable reel to provide said basic command signal which is greater in the pay-in direction of rotation of said cable reel than in the pay-out direction of rotation of said cable reel.

3. The control system of claim 1 wherein said transient command means further includes compensating means which receives said speed signal to further modify said acceleration signal upon a reversal of said speed signal.

4. A control system for use with a vehicle mounted cable reel, a hydraulic motor for driving said cable reel, a source of hydraulic fluid under pressure for driving said motor, and said control system modulating the fluid flow from said source to said motor comprising; flow control means responsive to the fluid pressure differential across said motor which represents a torque feedback signal, electrohydraulic transducer means providing an input command signal to said flow control means, basic command means providing a basic signal for controlling said transducer means, speed sensing means responsive to the rotation of said cable reel to provide a speed signal proportional to cable reel rpm, transient condition command means receiving said speed signal and differentiating said speed signal to provide an acceleration signal, said acceleration signal being further provided to said transducer means to modify said basic signal in response to cable reel deceleration and acceleration to form said command signal, said flow control means responding to said command signal, said flow control means responding to said command signal to drive said motor in a manner which reaches equilibrium between said torque feedback signal and said command signal, and wherein said source of fluid power to said hydraulic motor consists of a variable displacement pump driven at constant rpm, said pump having servo control means for varying the displacement thereof, and said flow control means consists of a variable pressure control valve modulating fluid flow to said servo control means, said variable pressure control valve having a valve spool movable in response to said torque feedback signal provided by connection to fluid lines interconnecting said variable displacement pump and said fluid motor, said valve speed also being movable in response to a pressure differential generated by said electrohydraulic transducer means.

5. The control system of claim 4 wherein said cable reel is driven by said motor in a pay-in direction of rotation to wind cable on said cable reel and the fluid pressure on said motor resists rotation of said cable reel in a pay-out direction of rotation to maintain tension on said cable.

6. The control system of claim 5 wherein said basic signal has a first level of command during a pay-in condition of said cable reel and a second lower level of command during the pay-out condition of said cable reel, the difference in command level between said pay-in and said pay-out conditions adjusting the torque command to said motor to compensate for friction differentials on said cable reel during a pay-in condition and a pay-out condition.

7. The control system of claim 6 further including cable reel diameter sensing means providing a diameter signal proportional to the amount of cable on said cable reel, said diameter signal being applied to said electrohydraulic transducer to increase said electric command upon an increase of cable wound on said cable reel.

8. A control system for use with a vehicle mounted cable reel having a drive mechanism, said control system controlling the drive torque output of said mechanism to a cable reel wherein said cable reel has a pay-in direction of rotation and a pay-out direction of rotation, said control system comprising;
basic command means providing a basic command signal for controlling said drive mechanism, said basic command means including direction detector means responsive to the rotation of said cable reel to provide said basic command signal which is greater in the pay-in direction of rotation of said cable reel than in the pay-out direction of rotation of said cable reel, and wherein said basic command means further includes diameter sensing means for determining the instantaneous diameter of the cable on said cable reel to modify said basic command signal in a decreasing direction as cable is unwound from said cable reel,
speed sensing means responsive to the rotation of said cable reel to provide a speed signal proportional to cable reel rpm, transient condition command means responsive to the output of said speed sensing means to provide a transient condition signal for addition to said basic command signal, and
summing means for receiving both said basic command signal and said transient condition signal and having an output signal provided to said drive mechanism whereby said basic command signal is modified by said transient condition signal.

9. A control system for use with a vehicle mounted cable reel having a drive mechanism, said control system controlling the drive torque output of said mechanism to a cable reel capable of rotation in a pay-in direction and in an opposite pay-out direction, said control system comprising; command means providing a command signal for controlling said drive mechanism, said command means including direction detector means responsive to the rotation of said cable reel to provide a pay-in and pay-out signal wherein said pay-in signal is greater than said pay-out signal to make up for reversal of cable friction between the pay-in direction of rotation and the pay-out direction of rotation, said pay-in and said pay-out signals being supplied to said drive mechanism for controlling the operation thereof, said command means further including feedback responsive means sensing the drive torque applied by said drive mechanism to said cable reel to provide a torque feedback signal for application to said drive mechanism, said command signal controlling said drive mechanism to maintain equilibrium with said torque feedback signal, and wherein said control system further includes diameter sensing means for determining the instantaneous diameter of the cable on said cable reel to modify said pay-in signal in an increasing direction as cable is wound on said cable reel and modify said pay-out signal in a decreasing direction as cable is unwound from said cable reel.

10. A control system for use with a vehicle mounted cable reel having a drive mechanism, said control system controlling the drive torque output of said mechanism to a cable reel capable of rotation in a pay-in direction and in an opposite pay-out direction, said control system comprising; command means providing a command signal for controlling said drive mechanism, said command means including direction detector means responsive to the rotation of said cable reel to provide a pay-in and a pay-out signal wherein said pay-in signal is greater than said pay-out signal to make up for reversal of cable reel friction between the pay-in direction of rotation and the pay-out direction of rotation, said pay-in and said pay-out signals being supplied to said drive mechanism for controlling the operation thereof, said command means further including feedback responsive means sensing the drive torque applied by said drive mechanism to said cable reel to provide a torque feedback signal for application to said drive mechanism, said command signal controlling said drive mechanism to maintain equilibrium with said torque feedback signal, and further including transient command means comprising speed sensing means responsive to the rotation of said cable reel to provide a speed signal proportional to cable reel rpm, said speed signal means providing an input for said direction detector means.

11. The control system of claim 10 including transient command means responsive to the speed signal of said speed sensing means and including differentiating means for converting said speed signal into an acceleration signal, and summing means receiving said command signal and said acceleration signal to provide an output signal to said drive mechanism whereby said command signal is modified by a said acceleration signal.

12. A control system for use with a vehicle mounted cable reel, a hydrostatic transmission consisting of a variable displacement pump driven at constant speed and connected to a hydraulic motor driving said cable reel, said variable displacement pump being of the axial piston type and having a movable swash plate for varying the displacement of said pump, servo control means for positioning said swash plate, and hydraulic valve means for controlling fluid flow to said servo control means, said control system comprising; torque feedback means measuring the pressure differential across said motor to apply a torque feedback signal to said hydraulic valve, an electrohydraulic transducer means providing a hydraulic signal to said hydraulic valve, basic command means providing a basic command signal to said electrohydraulic transducer means and consisting of cable reel diameter sensing means which increases said basic command signal upon an increase in amount of cable wound on said cable reel and cable reel rotational direction sensing means which increases the basic command signal when said cable reel is rotated in a direction to wind cable on said cable reel and decreases said basic command signal when said cable reel is rotated in a direction which reduces the amount of cable wound on said cable reel, transient condition command means including speed sensing means responsive to the rotation of said cable reel to provide a speed signal proportional to cable reel rpm and differentiating means for converting said speed signal into an acceleration signal, and means applying said acceleration signal to said electrohydraulic transducer means to modify the basic command signal upon a change of velocity of said cable reel.

* * * * *